_United States Patent Office_

3,845,058
Patented Oct. 29, 1974

3,845,058
N-(3,4-DIHYDRO NAPHTHYL)-N′ PHENYL PIPERAZINES
Sabino Lembo, Via Napoli 1, Pozzuoli, Italy; Rene Viterbo, 27 Rue de Fleurus, Paris, France; and Giulio Cesare Perri, Via Traversa Manzoni 2; and Michele Mastursi, Via S. Giacomo dei Capri 125, both of Naples, Italy
No Drawing. Continuation-in-part of abandoned application Ser. No. 56,712, July 20, 1970. This application Jan. 17, 1972, Ser. No. 218,548
Int. Cl. C07d 51/70
U.S. Cl. 260—268 BC     16 Claims

ABSTRACT OF THE DISCLOSURE

The invention relates to dihydronaphthalene derivatives of the formula

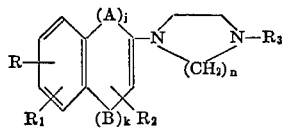

wherein R and $R_1$ are each individually selected from hydrogen, halogen, (lower)alkyl, (lower)alkoxy, nitro, (lower)alkyl thio or (lower)alkyl sulfonyl; $R_2$ is hydrogen, phenyl, or carboxy; $R_3$ is hydrogen, (lower)alkyl, phenyl, phenyl substituted with halogen, trifluoromethyl, (lower)alkoxy or (lower)alkyl, picolyl, benzyl, benzyl substituted with halogen, (lower)alkoxy or (lower)alkyl, (lower)alkoxycarbonyl, N - monoalkyl acetamide, N,N-dialkyl acetamide, N - phenyl acetamide, N - monoalkyl propionamide, or N,N-dialkyl propionamide, $n$ is a whole integer of 2 or 3; A and B are each independently selected from substituted or unsubstituted alkylene radicals having from 1 to 3 carbon atoms in the chain and having the formula

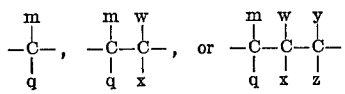

where $m$, $q$, $w$, $x$, $y$ and $z$ are each independently selected from hydrogen or (lower)alkyl; $j$ and $k$ are selected from whole integers of 0 or 1. The invention also includes the pharmaceutically acceptable acid addition salts of the compounds of the above general formula.

These derivatives have useful pharmacological activity including at least one of the following activities: analgesic, antiinflammatory, antipyretic, sedative, myorelaxant, antihypertensive, diuretic and choleretic activity.

---

This application is a continuation-in-part of our copending application, Ser. No. 56,712, filed July 20, 1970, and now abandoned.

This invention relates to new and useful derivatives of dihydronaphthalene and to their method of preparation. More particularly, this invention relates to new and useful derivatives of dihydronaphthalene having useful pharmacological activities.

The novel derivatives of dihydronaphthalene of this invention may be represented by the general formula

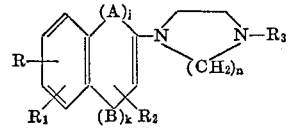

Formula I wherein R and $R_1$ are each individually selected from hydrogen, halogen, (lower)alkyl, (lower)alkoxy, nitro, (lower)alkyl thio or (lower)alkyl sulfonyl; $R_2$ is hydrogen, phenyl, or carboxy; $R_3$ is hydrogen, (lower)alkyl, phenyl, phenyl substituted with halogen, trifluoromethyl, (lower)alkoxy or (lower)alkyl, picolyl, benzyl, benzyl substituted with halogen, (lower)alkoxy or (lower)alkyl, (lower)alkoxycarbonyl, N-monoalkyl acetamide, N,N-dialkyl acetamide, N-phenyl acetamide, N-monoalkyl propionamide or N,N-dialkyl propionamide; $n$ is a whole integer of 2 or 3; A and B are each independently selected from substituted or unsubstituted alkylene radicals having from 1 to 3 carbon atoms in the chain and having the formula

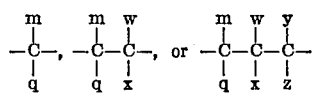

where $m$, $q$, $w$, $x$, $y$ and $z$ are each independently selected from hydrogen or (lower)alkyl; $j$ and $k$ are selected from whole integers of 0 or 1. The invention also includes the pharmaceutically acceptable acid addition salts of the compounds of the above general formula.

A preferred class of compounds of this invention are those wherein R and $R_1$ are each individually selected from hydrogen, halogen such as chlorine and bromine, and (lower)alkoxy; $R_2$ is hydrogen; $R_3$ is (lower)alkyl, phenyl or phenyl substituted with halogen or lower alkoxy; picolyl, benzyl or benzyl substituted with (lower)alkyl, (lower)alkoxy carbonyl, and N,N-dialkyl acetamide; $j$ and $k$ are 0 or 1, $n$ is 2, and A and B are selected from the radicals —$CH_2$—$CH_2$—, —$CH(CH_3)$—$CH_2$—,

—$C(CH_3)_2$—, or —$CH_2$—.

In the above definitions for R, $R_1$, $R_2$, $R_3$, $m$, $q$, $w$, $x$, $y$, and $z$, (lower)alkyl and the (lower)alkyl portion of radicals are meant to include alkyl radicals containing from 1 to 6 carbon atoms. The term halogen includes all four halogens, viz., fluorine, chlorine, bromine and iodine.

In the compounds of this invention there may be mentioned methyl, ethyl, propyl, isopropyl, butyl, tertiary butyl, pentyl and hexyl and the like as examples of the (lower)alkyl radicals which R, $R_1$, $R_2$ $R_3$, $m$, $q$, $w$, $x$, $y$ and $z$ may represent. As examples of (lower)alkoxy radicals there may be mentioned, for example, methoxy, ethoxy, propoxy, butoxy and the like. As examples of mono and di(lower)alkyl amino radicals there may be mentioned, for example, methylamino, dimethylamino, ethylamino diethylamino, dibutylamino and the like. Suitable mono and dialkyl acetamides and propionamides include, for example, N,N-dimethylacetamide, N,N - diethylacetamide, N,N-dipropylacetamide, N-methylacetamide, N-n-propylacetamide, N-butylacetamide, N-methylpropionamide, N,N-diethylpropionamide, N,N-dibutylpropionamide and the like. As examples of suitable substituted phenyl and benzyl radicals there may be mentioned, for example, chlorophenyl, bromophenyl, methoxyphenyl, chlorobenzyl, methoxybenzyl and the like.

The compounds of the above formula form pharmaceutically acceptable non-toxic acid-addition salts with both inorganic and organic acids, such as, for example, hydrochloric, hydrobromic, sulfuric, phosphoric acids and the like inorganic acids, as well as with organic carboxylic acid, such as, acetic, propionic, glycolic, lactic, pyruvic, malonic, succinic, fumaric, malic, tartaric, citric, ascorbic, maleic, hydroxymaleic, benzoic, phenylacetic, 4-aminobenzoic, salicylic and the like, and are also included within the scope of this invention.

The novel compounds of this invention have at least one valuable pharmacological property and utility since they exhibit one or more of the following activities: analgesic, antiinflammatory, antipyretic, sedative, myorelaxant, antihypertensive, diuretic and choleretic activities.

The compounds can be administered internally, for example, orally and parenterally, and can be compounded into different suitable pharmaceutical forms such as tablets, capsules, lozenges, suspensions, suppositories, solutions and the like. Dosage can be adjuted to individual requirements. Additionally, the compounds of this invention can be used as intermediates in the preparation of other products with pharmacologic activity.

The pharmacological activity of the compounds of this invention were determined utilizing the following procedures:

Analgestic Activity—E. Adami et al., Arch. Int. Pharm., 107, 322 (1956).

Antiinflammatory Activity—C. A. Winter et al., Proc. Soc. Exper. Biol. Med., 111, 544 (1962).

Myorelaxant Activity—W. J. Kinnard et al., J. Pharm., Exper. Ther., 121, 354 (1957).

Choleretic Activity—F. Chiancone, Boll. Soc. Ital. Sper., 25, 676 (1949).

Diuretic Activity—C. Kagawa et al., Arch. Int. Pharm., 137, 241 (1962).

Spontaneous Motility Activity—P. Dews, Brit. J. Pharm. 8, 46 (1953).

The compounds of the present invention are novel and useful and are quite different from the closest known prior art compounds, such as, the indene-enamines disclosed in German Offenlegungsschrift 1,545,722, assigned to Chemische Werke Albert, published Dec. 12, 1969 and the dihydronaphthalene compounds of the type disclosed in German Pat. 1,190,466, published Apr. 8, 1965 and assigned to Cassella Farbwerke Mainkur A.G., as antihypertonic agents.

According to this invention, the novel compounds of this invention are prepared in a one-step reaction in excellent yields and good purity by reacting an enolizable keto derivative, that is, a 3,4-dihydro naphthalenone compound, with a suitable piperazine or homopiperazine dissolved in an anhydrous organic aprotic, water nonmiscible solvent, in the presence of a Lewis acid at a temperature between about 0° C. and the boiling point of the solvent according to the following reaction scheme wherein R, $R_1$, $R_2$, $R_3$, A, B, $j$, $k$, and $n$ are as previously defined.

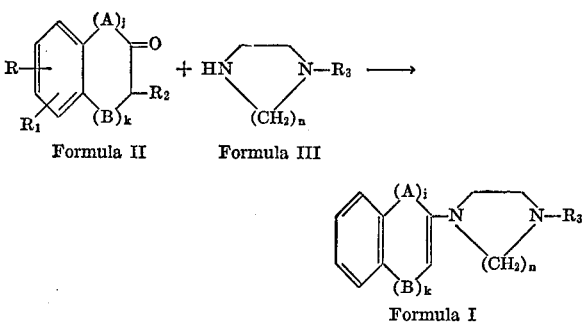

Formula II    Formula III

Formula I

As examples of suitable solvents for the reaction there may be mentioned any suitable organic solvent, inert under the conditions of the reaction, such as, for example, benzene, toluene, xylene, petroleum ether, ethyl ether and the like, preferably toluene.

Although p-toluene sulfonic acid monohydrate is the preferred acid employed in the reaction of this invention, any other suitable Lewis acid may be employed. Included, for example, are $TiCl_4$, $SnCl_4$, $BF_3$ and other salts of a strong mineral acid with a weak organic base such as piperazine hydrochloride or others.

The reaction mixture is refluxed, with the simultaneous elimination of the water formed during the reaction, when a Lewis acid is used in a small quantity and the reaction time is between 1 and 24 hours. However, when the reaction is carried out at a lower temperature, a large amount of Lewis acid must be employed to take up the water formed during the reaction and the reaction time is between about 1 and 100 hours.

The compounds of this invention can be also prepared by reacting a compound of Formula I wherein $R_3$ is hydrogen with an alkylating, or acylating agent, if necessary, in the presence of an inorgnaic or organic strong base, such as anhydrous sodium carbonate or bicarbonate or other basic alkali metal salt or alcoholate or organic tertiary nitrogen base, for example, pyridine, alkyl piperidine, triethylamine and the like. The reaction takes place in an anhydrous organic solvent at a temperature between 0° C. and the boiling point of the solvent. As example of solvents there may be mentioned any suitable organic solvent, inert under the conditions of the reaction, such as, for example, ethanol, methanol, benzene, toluene, xylene, petroleum ether, ethyl ether and the like. As example of an alkylating agent, there may be mentioned any suitable haloalkyl derivatives, such as $\alpha$-chloroacetamide and $\alpha$- (or $\beta$)-chloropropionamide and the like; olefinic derivatives able to give addition compounds with secondary amines such as, for example, acrylonitrile, ethylacrylate and the like. As example of acylating agent, there may be mentioned any alkanoyl halide or aroyl halide, such as acetyl chloride or benzoyl chloride or the like, or any suitable alkylisocyanate or alkylthioisocyanate.

Recovery of the product from the reaction mixture is accomplished by cooling and neutralizing the acidic reaction mixture with an aqueous solution of a base, such as, for example, a saturated sodium bicarbonate solution or any other suitable organic or inorganic base including a basic ion exchange resin. After drying, such as, for example, over sodium sulfate, the neutral organic layer is evaporated under vacuum to provide the products of the invention which can then be purified by any of the usual purification methods, such as, for example, by crystallization, distillation, chromatography or the like. The chemical structure of the compounds are confirmed by infrared and ultraviolet spectra, as set forth in Table I following the examples, and by the correspondence between calculated values for the elements and values found by chemical analysis.

The following examples are illustrative of the invention.

EXAMPLE 1

N-(3,4-dihydro-1-naphthyl)-N'-carbethoxy-piperazine

In a reaction vessel, 30 g. 3,4-dihydro-1(2H)-naphthalenone, 34 g. N-carbethoxypiperazine, and 5 g. p-toluenesulfonic acid monohydrate were dissolved in 200 ml. anhydrous toluene. The mixture was refluxed for 28 hours separating off the water with a Dean-Stark trap. The cooled solution was treated with a saturated $NaHCO_3$ solution, washed with water, dried over anhydrous $Na_2SO_4$ and then distilled. The residue was distilled yielding 14.1 g. of compound with a boiling point of 186° C./ 0.005 mm. Hg which was dissolved in benzene-petroleum ether (40° to 70° C.) 1:1 and then filtered through neutral $Al_2O_3$. The eluate was evaporated under vacuum and the residue was crystallized from petroleum-ether (40° to 70° C.); the white crystals obtained had a melting point of 73°–74° C.

EXAMPLE 2

N-(3,4-dihydro-1-naphthyl)-N'-benzylpiperazine

In a reaction vessel, 30 g. 3,4-dihydro-1(2H)-naphthalenone, 54 g. N-benzylpiperazine, and 5 g. p-toluenesulfonic acid monohydrate were dissolved in 200 ml. anhydrous toluene. The solution was refluxed for 28 hours, separating off the water with a Dean-Stark trap. The cooled solution was treated with a saturated $NaHCO_3$ solution, washed with water, dried over anhydrous $Na_2SO_4$ and then distilled. The residue was crystallized from ethylacetate-benzene obtaining 18.4 g. of white crystals with a melting point of 130°–131° C.

EXAMPLE 3

N-(3,4-dihydro-1-naphthyl)-N'-methyl-piperazine

In a reaction vessel, 30 g. 3,4-dihydro-1(2H)-naphthalenone, 30.8 g. N-methylpiperazine, and 3 g. p-toluenesulfonic acid monohydrate were dissolved in 150 ml. anhydrous toluene. The mixture was refluxed for 30 hours, separating off the water with a Dean-Stark trap. The cooled solution was treated with a saturated $NaHCO_3$ solution, washed with water and dried over anhydrous $Na_2SO_4$, and then distilled. The crystalline residue (36 g.) was distilled, boiling point 136° C./0.005 mm. Hg, and then crystallized from petroleum ether (40° to 70° C.) obtaining white crystals with a melting point of 90°–92° C.

EXAMPLE 4

N-(3,4-dihydro-1-naphthyl)-N'-phenyl-piperazine

In a reaction vessel, 30 g. 3,4-dihydro-1(2H)-naphthalenone, 49.9 g. N-phenylpiperazine, and 7.5 g. p-toluenesulfonic acid monohydrate were dissolved in 200 ml. toluene. The solution was refluxed for 24 hours, separating off the water with a Dean-Stark trap. The cooled solution was treated with a saturated $NaHCO_3$, washed with water and dried over anhydrous $Na_2SO_4$, and then distilled. The crystalline residue was distilled, yielding 21.3 g. of compound which was crystallized from ethylacetate. The white crystals obtained have a melting point of 101°–102° C.

EXAMPLE 5

N-(3,4-dihydro-1-naphthyl)-N'-n-butyl piperazine

In a reaction vessel, 20 g. 3,4-dihydro-1(2H)-naphthalenone, 21 g. n-butyl piperazine, and 4.5 g. p-toluene sulfonic acid monohydrate were dissolved in 150 ml. of toluene. The solution was refluxed 24 hours separating off the water with a Dean-Stark trap. The cooled solution was treated with a saturated $NaHCO_3$ solution, washed with water, dried over anhydrous $Na_2SO_4$ and then distilled. The crystalline residue was distilled, B.P. 121°–124° C./0.003 mm. Hg, yielding 9.7 g. of compound which was crystallized from petroleum ether (40° to 70° C.). The white crystals obtained had a melting point of 43°–44° C.

EXAMPLE 6

N-(4-methyl-3,4-dihydro-1-naphthyl)-N'-phenyl-piperazine

In a reaction vessel, 25 g. 4-methyl-3,4-dihydro-1(2H)-naphthalenone, 35 g. N-phenylpiperazine, and 4.5 g. p-toluene sulfonic acid monohydrate were dissolved in 480 ml. anhydrous toluene. The mixture was refluxed for 18 hours, separating off the water with a Dean-Stark trap. The cooled solution was treated with a saturated $NaHCO_3$ solution, washed with water, dried over anhydrous $Na_2SO_4$, and then distilled. The crystalline residue was distilled, B.P. 180°–215° C./0.006 mm. Hg, yielding 19.5 g. of compound which was crystallized from petroleum ether (40° to 70° C.). The white crystals obtained had a melting point of 101°–103° C.

EXAMPLE 7

N-(3,4-dihydro-1-naphthyl)-N'-4-methoxyphenyl-piperazine

In a reaction vessel, 25 g. 3,4-dihydro-1(2H)-naphthalenone, 47.2 g. N-4-methoxyphenylpiperazine, and 4.5 g. p-toluene sulfonic acid monohydrate were dissolved in 180 ml. anhydrous toluene. The mixture was refluxed for 18 hours separating off the water with a Dean-Stark trap. The cooled solution was treated with a saturated $NaHCO_3$ solution, washed with water, dried over anhydrous $Na_2SO_4$, and then distilled. The solid residue (30 g.) after crystallization from chloroform-ethylacetate, had a melting point of 156°–158° C.

EXAMPLE 8

N-(3,4-dihydro-2-naphthyl)-N'-methylpiperazine

In a reaction vessel, 30 g. 3,4-dihydro-2(1H)-naphthalenone, 30.8 g. N-methylpiperazine, and 5 g. p-toluene sulfonic acid monohydrate were dissolved in 150 ml. anhydrous toluene. The mixture was refluxed for 24 hours, separating off the water with a Dean-Stark trap. The cooled solution was treated with a saturated $NaHCO_3$ solution, washed with water, dried over anhydrous $Na_2SO_4$, and then distilled. The residue was distilled, boiling point 150°–154° C./0.005 mm. Hg, yielding 21.6 g. of compound which was crystallized from petroleum ether (40° to 70° C.). The white crystals obtained had a melting point of 65°–67° C.

EXAMPLE 9

N-(3,4-dihydro-2-naphthyl)-N'-benzylpiperazine

In a reaction vessel, 20 g. 3,4-dihydro-2(1H)-naphthalenone, 36 g. N-benzylpiperazine, and 4.5 g. p-toluene sulfonic acid monohydrate were dissolved in 150 ml. anhydrous toluene. The mixture was refluxed for 17 hours separating off the water with a Dean-Stark trap. After cooling the solution was treated with a saturated $NaHCO_3$ solution, washed with water and dried over anhydrous $Na_2SO_4$. After evaporation of the solvent, the residue was distilled yielding 22.3 g. of pale yellow liquid with boiling point 190° C./0.002 mm. Hg.

EXAMPLE 10

N-(3,4-dihydro-2-naphthyl)-N'-isopropyl-piperazine

In a reaction vessel, 20 g. 3,4-dihydro-2(1H)-naphthalenone, 26.4 g. N-isopropylpiperazine, and 4.5 g. p-toluene sulfonic acid monohydrate were dissolved in 150 ml. anhydrous toluene. The mixture was refluxed for 17 hours separating off the water with a Dean-Stark trap. The cooled solution was treated with a saturated $NaHCO_3$ solution, washed with water, dried over anhydrous $$Na_2SO_4,$$

and then distilled. The residue was distilled yielding 9.7 g. of compound, B.P. 164° C./0.005 mm. Hg, which was crystallized from hexane. The white crystals obtained had a melting point of 64°–65° C.

EXAMPLE 11

N-(7-methoxy-3,4-dihydro-2-naphthyl)-N'-methyl-piperazine

In a reaction vessel, 25 g. 7-methoxy-3,4-dihydro-2(1H)-naphthalenone, 25 g. N-methylpiperazine, and 5 g. p-toluenesulfonic acid monohydrate were dissolved in 150 ml. anhydrous toluene. The mixture was refluxed for 4 hours separating off the water with a Dean-Stark trap. The cooled solution was treated with a saturated $NaHCO_3$ solution, washed with water, dried over anhydrous $Na_2SO_4$ and then distilled. The residue was distilled resulting in 23.7 g. of compound with a boiling point of 150° C./0.002 mm. Hg.

EXAMPLE 12

N-(7-methoxy-3,4-dihydro-2-naphthyl)-N'-carbethoxy-piperazine

In a reaction vessel, 25 g. 7-methoxy-3,4-dihydro-2(1H)-naphthalenone, 25 g. N-carbethoxypiperazine, and 5 g. p-toluenesulfonic acid monohydrate were dissolved in 125 ml. anhydrous toluene. The mixture was refluxed for 4 hours separating off the water with a Dean-Stark trap. The cooled solution was treated with a saturated $NaHCO_3$ solution, washed with water, dried over anhydrous $Na_2SO_4$, and then distilled. The residue was crystallized from ethylacetate yielding 14.5 g. of white crystals with a melting point of 93°–95° C.

EXAMPLE 13

N-(3,4-dihydro-2-naphthyl)-N'-phenyl-piperazine

In a reaction vessel, 30 g. 3,4 - dihydro-2(1H)-naphthalenone, 49.9 g. N-phenylpiperazine, and 7.5 g. p-toluenesulfonic acid monohydrate were dissolved in 200 ml. anhydrous toluene. The solution was refluxed for 3 hours, separating off the water with a Dean-Stark trap. The cooled solution was treated with a saturated NaHCO$_3$ solution; washed with water, dried over anhydrous Na$_2$SO$_4$, and then distilled. The residue was dissolved in 250 ml. benzene and 250 petroleum ether (40° to 50° C.) and chromatographed over 450 g. neutral Al$_2$O$_3$. The benzene-petroleum ether 1:1 eluate, after evaporation of solvent, yielded 28 g. of solid residue which was crystallized from benzene-petroleum ether; M.P. 120°–122° C.

EXAMPLE 14

N,N'-bis-(3,4-dihydro-2-naphthyl)-homopiperazine

In a reaction vessel, 25 g. 3,4-dihydro-2(1H)-naphthalenone, 25 g. homopiperazine, and 5 g. p-toluenesulfonic acid monohydrate were dissolved in 150 ml. anhydrous toluene. The solution was refluxed for 3 hours separating off the water with a Dean-Stark trap. The cooled solution was treated with a saturated NaHCO$_3$ solution, washed with water and dried over anhydrous Na$_2$SO$_4$. The solution was concentrated to 50 ml., 100 ml. petroleum ether was added to it, and the final solution was chromatographed over 80 g. neutral Al$_2$O$_3$. The eluate was evaporated under vacuum and the residue crystallized from ethylacetate yielded white crystals with a melting point of 128°–130° C.

EXAMPLE 15

N-(3,4-dihydro-2-naphthyl)-N'-formyl-piperazine

In a reaction vessel, 19 g. 3,4-dihydro-2(1H)-naphthalenone, 17 g. N-formylpiperazine, and 4 g. p-toluenesulfonic acid monohydrate were dissolved in 150 ml. anhydrous toluene. The solution was refluxed for 20 hours separating off the water with a Dean-Stark trap. The cooled solution was treated with a saturated NaHCO$_3$ solution, washed with water, dried over anhydrous Na$_2$SO$_4$ and then filtered through neutral Al$_2$O$_3$. The clarified solution was concentrated to about 60 ml. The obtained precipitate (5.1 g.) was discarded and the filtered solution was evaporated under vacuum. The residue (10 g.), crystallized from methanol, had a melting point of 115°–117° C.

EXAMPLE 16

N-(7-chloro-3,4-dihydro-1-naphthyl)-N'-(p-chlorophenyl)-piperazine

A solution of 13.2 g. TiCl$_4$ in 30 ml. anhydrous benzene was added to a stirred solution cooled down to 0° C. of 25 g. 7-chloro-3,4-dihydro-1(2H)-naphthalenone and 83.3 g. N-(p-chlorophenyl)-piperazine in 400 ml. anhydrous benzene in a reaction vessel. The mixture was stirred for 24 hours at room temperature. The solid precipitate obtained was filtered off and the solution was treated with a saturated NaHCO$_3$ solution, washed with water, dried over anhydrous Na$_2$SO$_4$ and then distilled. The residue (46.7 g.) was crystallized from benzene; M.P. 172°–174° C.

EXAMPLE 17

N-(1,1-dimethyl-1,4-dihydro-2-naphthyl)-N'-methyl-piperazine

A solution of 11.4 g. TiCl$_4$ in 250 ml. anhydrous benzene was added to a stirred solution cooled to 0° C. of 21 g. 1,1-dimethyl-3,4-dihydro-2(1H)-naphthalenone and 45 g. N-methylpiperazine in 250 ml. anhydrous benzene in a reaction vessel. The solution was stirred for 5 hours and then allowed to settle overnight at room temperature. The mixture was treated with a saturated NaHCO$_3$ solution, washed with water, dried over anhydrous Na$_2$SO$_4$, and then distilled. The residue was distilled yielding 8.9 g. of compound with a boiling point of 120° C./0.01 mm. Hg which was crystallized from petroleum ether (40° to 70° C.); M.P. 73°–75° C.

EXAMPLE 18

N-(8-methoxy-3,4-dihydro-2-naphthyl)-N'-p-chlorophenylpiperazine

In a reaction vessel, 20 g. 8 - methoxy-3,4-dihydro-2(1H)-naphthalenone, 26.6 g. p-chlorophenylpiperazine and 5 g. p-toluenesulfonic acid monohydrate were dissolved in 150 ml. anhydrous toluene. The mixture was refluxed for 4 hours separating off the water with a Dean-Stark trap. The cooled solution was treated with a saturated NaHCO$_3$ solution, washed with water, dried over anhydrous Na$_2$SO$_4$ and then distilled under vacuum. The residual 33 g. of product were crystallized from benzene-chloroform obtaining 14 g. of white crystals with a melting point of 177°–179° C.

EXAMPLE 19

N-(1,1-dimethyl-1,4-dihydro-2-naphthyl)-N'-phenylpiperazine 15.1 g. TiCL$_4$ were added to a stirred and cooled 0° C. solution of 21 g. 1,1-dimethyl-3,4-dihydro-2(1H)-naphthalenone and 84.7 g. N-phenylpiperazine in 500 ml. anhydrous toluene in a reaction vessel. The solution was allowed to settle 36 hours at room temperature. The mixture was treated with a saturated NaHCO$_3$ solution, washed with water, dried over anhydrous Na$_2$SO$_4$ and then distilled. The residue (18.5 g.) was crystallized from ethylacetate yielding white crystals with a melting point of 119°–120° C.

EXAMPLE 20

N-(3,4-dihydro-1-naphthyl)-N'-(N,N-dimethylacetamide)piperazine

In a reaction vessel, 10.6 g. 3,4-dihydro-1(2H)-naphthalenone, 15 g. N-(N,N-dimethylacetamide)piperazine and 2 g. p-toluenesulfonic acid monohydrate were dissolved in 100 ml. anhydrous toluene. The mixture was refluxed for 24 hours, separating off the water with a Dean-Stark trap. The cooled solution was treated with a saturated NaHCO$_3$ solution, washed with water, dried over anhydrous Na$_2$SO$_4$ and then distilled under vacuum. The residue was distilled, boiling point 220°–230° C./0.02 mm. Hg and then crystallized from petroleum ether (40° to 70° C.)—chloroform yielding white crystals with a melting point of 92°–93° C.

EXAMPLE 21

N-(3,4-dihydro-2-naphthyl)-N-(N-n-propylacetamide) piperazine

In a reaction vessel, 14 g. 3,4-dihydro-2(1H)-naphthalenone, 17.5 g. N-(N-n-propylacetamide)piperazine, and 2.5 g. p-toluenesulfonic acid monohydrate were dissolved in 200 ml. anhydrous toluene. The mixture was refluxed for 5 hours separating off the water with a Dean-Stark trap. The cooled solution was treated with a saturated NaHCO$_3$ solution, washed with water, dried over anhydrous Na$_2$SO$_4$, filtered and then distilled. The residue (20 g.) was dissolved in hot cyclohexane-ethylacetate and then filtered through neutral Al$_2$O$_3$. The clarified solution yielded, with cooling, a precipitate with a melting point of 91°–92° C.

EXAMPLE 22

N-(3,4-dihydro-1-naphthyl)-N-(2,5-dimethylbenzyl) piperazine

In a reaction vessel, 19 g. 3,4-dihydro-1(2H)-naphthalenone, 30.5 g. N-(2,5-dimethylbenzyl)piperazine, and 5 g. p-toluenesulfonic acid monohydrate were dissolved in 150 ml. anhydrous toluene. The mixture was refluxed for 22 hours, separating off the water with a Dean-Stark trap. The cooled solution was treated with a saturated NaHCO$_3$ solution, washed with water, dried over anhydrous Na$_2$SO$_4$ and then distilled under vacuum. The residue (15 g.) was dissolved in hot petroleum ether (40°–70° C.) ethylacetate mixture and filtered through neutral Al$_2$O$_3$. The solution was cooled and the precipitate filtered and crystallized from ethylacetate, yielding 9.2 g. of white crystals; M.P. 125°–127° C.

EXAMPLE 23

N-(3,4-dihydro-2-naphthyl)-N'-(3-picolyl) piperazine

In a reaction vessel, 15 g. 3,4-dihydro-2(1H)-naphthalenone, 20 g. N-(3-picolyl)-piperazine, and 4 g. p-toluenesulfonic acid monohydrate were dissolved in 100 ml. anhydrous benzene. The mixture was refluxed for 22 hours, separating off the water with a Dean-Stark trap. The cooled mixture was treated with a saturated NaHCO$_3$ solution, washed with water, dried over anhydrous Na$_2$SO$_4$, filtered and then distilled under vacuum. The residue (14.8 g.) was dissolved in hot ethylacetate-petroleum ether (40° to 70° C.) solution and filtered through neutral Al$_2$O$_3$. The precipitate obtained after cooling was recrystallized from ethylacetate-petroleum ether; M.P. 98°–99° C.

EXAMPLE 24

N-(3,4-dihydro-1-naphthyl)-N'-(3-picolyl)piperazine

In a reaction vessel, 15 g. 3,4-dihydro-1(2H)-naphthalenone, 20 g. N-(3-picolyl)piperazine, and 4 g. p-toluenesulfonic acid monohydrate were dissolved in 150 ml. anhydrous toluene. The mixture was refluxed for 22 hours, separating off the water with a Dean-Stark trap. The cooled mixture was treated with a saturated NaHCO$_3$ solution, washed with water, dried over anhydrous Na$_2$SO$_4$, filtered and then distilled under vacuum. The residue (14.2 g.) was dissolved in a hot solution of ethylacetate-petroleum ether (40°–70° C.) and filtered through neutral Al$_2$O$_3$. After cooling the precipitate obtained was crystallized from ethylacetate and had a melting point of 115°–116° C.

EXAMPLE 25

N-(6-chloro-3,4-dihydro-2-naphthyl)-N'-methylpiperazine

In a reaction vessel, 14.5 g. 6-chloro-3,4-dihydro-2(1H)-naphthalenone, 12.5 g. N-methylpiperazine, and 4 g. p-toluenesulfonic acid monohydrate were dissolved in 200 ml. anhydrous benzene. The mixture was refluxed for 2 hours separating off the water with a Dean-Stark trap. The cooled mixture was treated with a saturated NaHCO$_3$ solution, washed with water and dried over anhydrous Na$_2$SO$_4$. The solution was filtered through neutral Al$_2$O$_3$ and then distilled under vacuum. The residue (15 g.) was crystallized from ethylacetate-petroleum ether (40°–70° C.), M.P. 99°–100° C.

EXAMPLE 26

N-(6-chloro-3,4-dihydro-2-naphthyl)-N'-phenylpiperazine

In a reaction vessel, 14.5 g. 6-chloro-3,4-dihydro-2(1H)-naphthalenone, 16.1 g. N-phenylpiperazine, and 4 g. p-toluenesulfonic acid monohydrate were dissolved in 200 ml. anhydrous benzene. The mixture was refluxed for 2 hours separating off the water with a Dean-Stark trap. The cooled solution was treated with a saturated NaHCO$_3$ solution, washed with water and dried over anhydrous Na$_2$SO$_4$. The solution was filtered through neutral Al$_2$O$_3$ and then distilled under vacuum. The 16.4 g. of residue were crystallized from benzene-chloroform; M.P. 163°–166° C.

EXAMPLE 27

N-(4-phenyl-3,4-dihydro-1-naphthyl)-N'-methylpiperazine

In a reaction vessel, 16.9 g. 4-phenyl-3,4-dihydro-1(2H)-naphthalenone, 9.9 g. N-methylpiperazine, and 5 g. p-toluenesulfonic acid monohydrate were dissolved in 100 ml. anhydrous toluene. The mixture was refluxed for 43 hours separating off the water with a Dean-Stark trap. After cooling the mixture was treated with a saturated NaHCO$_3$ solution, washed with water, dried over anhydrous Na$_2$SO$_4$, filtered and then distilled under vacuum. The residue was distilled; 6.7 g. of compound, with a boiling point of 168°–170° C./0.002 mm. Hg, were dissolved in hot petroleum ether (40°–70° C.). The hot solution is filtered through neutral Al$_2$O$_3$ and then cooled, yielding a solid precipitate; M.P. 72°–74° C.

EXAMPLE 28

N-(7-bromo-3,4-dihydro-1-naphthyl)-N'-methylpiperazine 7.2 g. TiCl$_4$ dissolved in 30 ml. anhydrous benzene were slowly added to a stirred solution, cooled to 0° C., of 19 g. 7-bromo-3,4-dihydro-1(2H)-naphthalenone and 35 g. N-methylpiperazine in 240 ml. anhydrous benzene in a reaction vessel. The mixture was stirred for 48 hours at room temperature. A saturated NaHCO$_3$ solution was added; the organic layer was washed with water, dried over anhydrous Na$_2$SO$_4$ and distilled under vacuum. The residue (17.8 g.) was crystallized from petroleum ether (40°–70° C.); M.P. 72°–76° C.

EXAMPLE 29

N-(3,4-dihydro-2-naphthyl)-N'-(N-ethylacetamide) piperazine

In a reaction vessel, 20 g. 3,4-dihydro-2(1H)-naphthalenone, 27.4 g. N-(N-ethylacetamide)-piperazine, and 5 g. p-toluenesulfonic acid monohydrate were dissolved in 200 ml. anhydrous benzene. The benzene was refluxed for 4 hours separating off the water with a Dean-Stark trap. The cooled mixture was treated with a saturated NaHCO$_3$ solution, washed with water, dried over anhydrous Na$_2$SO$_4$, filtered and then distilled under vacuum. The residue was crystallized from ethylacetate, filtering the hot solution through neutral Al$_2$O$_3$. 21.5 g. of white compound were obtained; M.P. 112°–113° C.

EXAMPLE 30

1-(3,4-Dihydro-1-naphthyl)-4-(N-n-propyl-2-methylacetamide)piperazine

In a reaction vessel 20 g. 3,4-dihydro-1(2H)-naphthalenone, 28.4 g. N-(N-n-propyl - 2 - methylacetamide)-piperazine and 5 g. p-toluenesulfonic acid monohydrate in 120 ml. toluene were refluxed 24 hours, separating off the water with a Dean-Stark trap. The cooled solution was treated with a saturated NaHCO$_3$ solution, washed with water, dried over anhydrous Na$_2$SO$_4$ and then distilled under vacuum. The residual 28.2 g. were distilled, B.P. 192–196° C./0.005 mm. Hg, yielding 14.1 g. of compound which was crystallized from petroleum ether (40 to 70° C.). The 1-(3,4-dihydro-1-naphthyl) - 4 - (N-n-propyl-2-methylacetamide)-piperazine obtained had a melting point of 72–73° C.

EXAMPLE 31

1-(7-Methyl-3,4-dihydro-1-naphthyl)-4-(2-methoxyphenyl)piperazine

In a reaction vessel 25 g. 7-methyl-3,4-dihydro-1(2H)-naphthalenone, 36 g. 1-(2-methoxyphenyl)-piperazine and 5 g. p-toluenesulfonic acid monohydrate in 180 ml. toluene were refluxed 18 hours, separating off the water with a Dean-Stark trap. The cooled solution was treated with a saturated NaHCO$_3$ solution, washed with water, dried over anhydrous Na$_2$SO$_4$ and then distilled under vacuum. The residual 40 g. were dissolved in hot petroleum ether (40 to 70° C.) and then filtered through neutral Al₂O₃. The solution was cooled. The obtained 1-(7-methyl-3,4-dihydro-1-naphthyl) - 4 - (2 - methoxyphenyl)-piperazine had a melting point of 98–99° C.

EXAMPLE 32

1-(3,4-Dihydro-2-carboxy-1-naphthyl)-4-methylpiperazine

In a reaction vessel 17 g. 2-carboethoxy-3,4-dihydro-1(2H)-naphthalenone, 12.8 g. 1-methylpiperazine and 5 g. p-toluenesulfonic acid monohydrate in 150 ml. toluene were refluxed 22 hours, separating off the water with a Dean-Stark trap. The cooled mixture was treated with a saturated NaHCO₃ solution, washed with water, dried with anhydrous Na₂SO₄ and distilled under vacuum. The residual 19 grams were dissolved in hot ethylacetate and filtered through neutral Al₂O₃. The solution was cooled. The obtained 10 g. of 1-(3,4 - dihydro - 2 - carboxy-1-naphthyl)-4-methylpiperazine had a melting point of 100–101° C.

EXAMPLE 33

1-(3,4-Dihydro-2-carboxy-1-naphthyl)-4-phenylpiperazine

In a reaction vessel 6 g. 2-carbethoxy-3,4-dihydro-1-(2H)-naphthalenone, 5.3 g. 1-phenylpiperazine and 2.5 g. p-toluenesulfonic acid monohydrate in 120 ml. toluene were refluxed 22 hours, separating off the water with a Dean-Stark trap. The cooled mixture was treated with a saturated NaHCO₃ solution, washed with water, dried over anhydrous Na₂SO₄ and distilled under vacuum. The residue is crystallized from chloroform-ethylacetate yielding 2.02 g. of 1 - (3,4-dihydro-2-carboxy-1-naphthyl)-4-phenylpiperazine with a melting point of 173–176° C.

EXAMPLE 34

1-(3,4-Dihydro-7-nitro-1-naphthyl)-4-methylpiperazine

In a reaction vessel 9 g. 7-nitro - 3,4 - dihydro-1(2H)-naphthalenone, 18 g. 1-methylpiperazine and 6 g. p-toluenesulfonic acid monohydrate in 100 ml. toluene were refluxed 67 hours separating off the water with a Dean-Stark trap. The cooled mixture was treated with a saturated NaHCO₃ solution, washed with water, dried over anhydrous Na₂SO₄ and distilled under vacuum. The residual 10 g. of 1-(3,4-dihydro-7-nitro-1-naphthyl)-4-methylpiperazine were crystallized from ethylacetate and had a melting point of 114–115° C.

EXAMPLE 35

1-(3,4-Dihydro-7-methylthio-1-naphthyl)-4-(2-methoxyphenyl)piperazine

In a reaction vessel 25 g. 7-methylthio - 3,4 - dihydro-1(2H)-naphthalenone, 30 g. 1-(2-methoxyphenyl)-piperazine and 6 g. p-toluenesulfonic acid monohydrate in 150 ml. toluene were refluxed 45 hours separating off the water with a Dean-Stark trap. The cooled mixture was treated with a saturated solution of NaHCO₃, washed with water, dried over anhydrous Na₂SO₄ and distilled under vacuum. The residual 28.2 g. were distilled, B.P. 242–250° C./0.005 mm. Hg. The oily product was dissolved in 350 ml. petroleum ether (40 to 60° C.) and 35 ml. ethylacetate and filtered through neutral Al₂O₃. The solution was concentrated to 100 ml. and cooled. The obtained 12.7 g. of 1-(3,4-dihydro-7-methylthio - 1 - naphthyl)-4-(2-methoxyphenyl)-piperazine had a melting point of 89.5–101° C.

EXAMPLE 36

1-(3,4 - Dihydro - 7 - methylthio-1-naphthyl)-4-methylpiperazine

In a reaction vessel 25 g. 7 - methylthio-3,4-dihydro-1(2H)-naphthalenone, 19.5 g. 1-methylpiperazine and 6 g. p-toluenesulfonic acid monohydrate in 150 ml. toluene were refluxed 22 hours separating off the water with a Dean-Stark trap. The cooled mixture was treated with a saturated NaHCO₃ solution, washed with water, dried over anhydrous Na₂SO₄ and distilled under vacuum. The residual 30.6 g. were distilled, B.P. 158–160° C./0.005 mm. Hg 10.6 g. The compound was dissolved in 30 ml. of petroleum ether (40 to 60° C.), filtered through neutral Al₂O₃ and cooled at −10° C. The 8.5 g. of 1-(3,4-dihydro-7-methylthio-1-naphthyl) - 4 - methylpiperazine had a melting point of 51.5–53° C.

EXAMPLE 37

1-(1-Phenyl-3,4-dihydro-2-naphthyl)-4-methylpiperazine

In a reaction vessel 10 g. 1-phenyl-3,4-dihydro-2(1H)-naphthalenone, 12 g. 1-methylpiperazine and 5 g. p. toluenesulfonic acid monohydrate in 100 ml. toluene were refluxed 7 hours separating off the water with a Dean-Stark trap. The cooled mixture was treated with a saturated NaHCO₃ solution, washed with water, dried over anhydrous Na₂SO₄ and distilled under vacuum. The residual 11 g. were dissolved in petroleum ether (40 to 70° C.) and ethylacetate, filtered through neutral Al₂O₃ and cooled. 5.3 g. of 1-(1-phenyl-3,4-dihydro-2-naphthyl)-4-methylpiperazine were obtained with a melting point of 106–108° C.

EXAMPLE 38

1-(3,4 - Dihydro - 7-methylsulfonyl-1-naphthyl)-4-methylpiperazine

In a reaction vessel 12 g. 7-methylsulfonyl-3,4-dihydro-1(2H)-naphthalenone, 9 g. 1-methylpiperazine, and 5 g. p-toluenesulfonic acid monohydrate in 100 ml. toluene were refluxed 42 hours separating off the water with a Dean-Stark trap. The cooled mixture was treated with a saturated NaHCO₃ solution, washed with water, dried over anhydrous Na₂SO₄ and distilled under vacuum. The residual 16 g. of 1-(3,4-dihydro-7-methylsulfonyl-1-naphthyl)-4-methylpiperazine were crystallized from ethylacetate by filtering the hot solution through neutral Al₂O₃ and had a melting point of 151–152° C.

EXAMPLE 39

1-(3,4-Dihydro-7 - methoxy - 1 - naphthyl)-4-(2-methoxyphenyl)piperazine

In a reaction vessel 30 g. 3,4-dihydro-7-methoxy-1-(2H)-naphthalenone, 51.2 g. N-2-methoxyphenylpiperazine and 7 g. p-toluenesulfonic acid monohydrate in 200 ml. toluene were refluxed for 24 hours, separating off water with a Dean-Stark trap. The cooled solution was treated with a saturated NaHCO₃ solution, washed with water several times and dried over anhydrous Na₂SO₄ and then distilled. The crystalline residue was distilled under vacuum yielding 23 g. of compound which was crystallized from ethylacetate. The white crystals obtained have a melting point of 106–108° C.

EXAMPLE 40

1-(3,4-Dihydro - 7 - methylthio - 1 - naphthyl)-4-ethoxycarbonylpiperazine

In a reaction vessel 22 g. 7-methylthio-3,4-dihydro-1(2H)-naphthalenone, 21.8 g. 1-ethoxycarbonylpiperazine and 5.1 g. p-toluenesulfonic acid monohydrate in 150 ml. toluene were refluxed 48 hours, separating off the water with a Dean-Stark trap. The cooled solution was treated with a saturated NaHCO₃ solution, washed with water, dried over anhydrous Na₂SO₄ and then distilled under vacuum. The residual 33 g. were distilled, B.P. 200–205° C./0.005 mm. Hg, yielding 18 g. of compound which was dissolved in benzene and filtered through neutral Al₂O₃ and then crystallized from ethylacetate. 9.3 g. of 1-(3,4-dihydro-7-methylthio - 1 - naphthyl)-4-ethoxycarbonylpiperazine were obtained with a melting point of 86–88° C.

EXAMPLE 41

1-(3,4-Dihydro - 7 - methylthio - 1 - naphthyl)-4-phenyl-piperazine

In a reaction vessel 22 g. 7-methylthio-3,4-dihydro-1(2H)-naphthalenone, 22.2 g. 1-phenylpiperazine and 5.1 g. p-toluenesulfonic acid monohydrate in 150 ml. toluene were refluxed 48 hours separating off the water with a Dean-Stark trap. The cooled solution was treated with a saturated $NaHCO_3$ solution, washed with water, dried over anhydrous $Na_2SO_4$ and then distilled under vacuum. The residual 12 g. were dissolved in benzene and filtered through neutral $Al_2O_3$ and then crystallized from ethylacetate, yielding 6 g. of 1-(3,4-dihydro-7-methylthio-1-methyl) - 4 - phenylpiperazine with a melting point of 136–139° C.

EXAMPLE 42

1-(3,4-Dihydro - 7 - methylthio - 1 - naphthyl)-4-(3-trifluoromethylphenyl)piperazine In a reaction vessel 25.3 g. 7-methylthio-3,4-dihydro-1(2H) - naphthalenone, 36.3 g. 1 - (3 - trifluoromethylphenyl)piperazine and 6 g. p-toluenesulfonic acid monohydrate in 100 ml. toluene were refluxed 42 hours, separating off the water with a Dean-Stark trap. The cooled solution was treated with a saturated $NaHCO_3$ solution, washed with water, dried over anhydrous $Na_2SO_4$ and distilled under vacuum. The residual 44.9 grams were crystallized from ethylacetate. The obtained 14.3 g. of 1-(3,4-dihydro - 7 - methylthio-1-naphthyl)-4-(3-trifluoromethylphenyl)piperazine had a melting point of 122.5–124° C.

EXAMPLE 43

1-(3,4-Dihydro - 7 - methylthio-1-naphthyl)-4-(phenylacetamide)-piperazine

In a reaction vessel 11.2 g. 7-methylthio-3,4-dihydro-1(2H)-naphthalenone, 14 gr. 1-(N-phenylacetamide)-piperazine and 3 g. p-toluenesulfonic acid monohydrate in 75 ml. toluene were refluxed 24 hours separating off the water with a Dean-Stark trap. The cooled solution was treated with a saturated $NaHCO_3$ solution, washed with water, dried over anhydrous $Na_2SO_4$ and distilled under vacuum. The 19 g. of residue were dissolved in hot chloroform-hexane, filtered through neutral $Al_2O_3$ and cooled. 7.5 g. of 1-(3,4 - dihydro-7-methylthio-1-naphthyl)-4-(phenylacetamide)piperazine were obtained with a melting point of 119–121° C.

EXAMPLE 44

1-(3,4-Dihydro - 7 - methylthio-1-naphthyl)4-(2-chlorophenyl)piperazine

In a reaction vessel 25 g. 7-methylthio-3,4-dihydro-1(2H)-naphthalenone, 27 g. 1-(2 - chlorophenyl)piperazine and 6 g. p-toluenesulfonic acid monohydrate in 150 ml. toluene were refluxed 48 hours separating off the water with a Dean-Stark trap. The cooled solution was treated with a saturated $NaHCO_3$ solution, washed with water, dried over anhydrous $Na_2SO_4$ and distilled under vacuum. The residual 44 g. were crystallized from chloroform-hexane, 15.1 g. of 1-(3,4-dihydro-7-methylthio-1-naphthyl)-4-(2-chlorophenyl)piperazine were obtained with a melting point of 145–147° C.

EXAMPLE 45

1-(3,4-Dihydro-7-methylthio-1-naphthyl)-4-(4-methoxyphenyl)piperazine

In a reaction vessel 20 g. 7-methylthio-3,4-dihydro-1(2H)-naphthalenone, 22 g. 1-(4-methoxyphenyl)piperazine and 5 g. p-toluenesulfonic acid monohydrate in 100 ml. toluene were refluxed 48 hours separating off the water with a Dean-Stark trap. The cooled solution was treated with a saturated $NaHCO_3$ solution, washed with water, dried over anhydrous $Na_2SO_4$ and distilled under vacuum. The residual 32.2 g. were dissolved in hot ethylacetate-chloroform, filtered through neutral $Al_2O_3$ and cooled. 14.4 g. of 1-(3,4-dihydro-7-methylthio-1-naphthyl)-4-(4-methoxyphenyl)piperazine were obtained with a melting point of 133–135° C.

EXAMPLE 46

1-(3,4-dihydro-7-methyl-1-naphthyl)-4-(2-chlorophenyl)piperazine

In a reaction vessel 25 g. 7-methyl-3,4-dihydro-1(2H)-naphthalenone, 33.8 g. 1-(2-chlorophenyl)piperazine and 5 g. p-toluenesulfonic acid monohydrate in 100 ml. toluene were refluxed 48 hours separating off the water with a Dean-Stark trap. The cooled solution was treated with a saturated $NaHCO_3$ solution, washed with water, dried over anhydrous $Na_2SO_4$ and distilled under vacuum. The residual 31 g. were dissolved in petroleum ether (40 to 70° C.) ethylacetate, filtered through neutral $Al_2O_3$ and cooled. 15.4 g. of 1-(3,4-dihydro-7-methyl-1-naphthyl)-4-(2-chlorophenyl)piperazine were obtained with a melting point of 112–113° C.

EXAMPLE 47

1-(3,4-Dihydro-7-methoxy-1-naphthyl)-4-(3-methoxyphenyl)piperazine

In a reaction vessel 25 g. 7-methoxy-3,4-dihydro-1(2H)-naphthalenone, 30 g. 1-(3-methoxyphenyl)piperazine and 6 g. p-toluenesulfonic acid monohydrate in 150 ml. toluene were refluxed 48 hours separating off the water with a Dean-Stark trap. The cooled solution was treated with a saturated $NaHCO_3$ solution, washed with water, dried over anhydrous $Na_2SO_4$ and distilled under vacuum. The residual 40 g. were crystallized from chloroform-hexane. 17.2 g. of 1-(3,4-dihydro-7-methoxy-1-naphthyl)-4-(3-methoxyphenyl)piperazine were obtained with a melting point of 134–136° C.

EXAMPLE 48

1-(3,4-Dihydro-7-methoxy-1-naphthyl)-4-(2-chlorophenyl)piperazine

In a reaction vessel 25 g. 7-methoxy-3,4-dihydro-1(2H)-naphthalenone, 30.6 g. 1-(2-chlorophenyl)piperazine and 6 g. p-toluenesulfonic acid monohydrate in 120 ml. toluene were refluxed 48 hours separating off the water with a Dean-Stark trap. The cooled solution was treated with a saturated $NaHCO_3$ solution, washed with water, dried over anhydrous $Na_2SO_4$ and distilled under vacuum. The residual 39.5 g. were dissolved in hot ethylacetate-chloroform, filtered through neutral $Al_2O_3$ and cooled. 16.7 g. of 1-(3,4-dihydro-7-methoxy-1-naphthyl)-4-(2-chlorophenyl)piperazine were obtained with a melting point of 135–136.5° C.

EXAMPLE 49

1-(3,4-Dihydro-7-methoxy-1-naphthyl)-4-(4-methoxyphenyl)piperazine

In a reaction vessel 21.2 g. 7-methoxy-3,4-dihydro-1-(2H)-naphthalenone, 24.9 g. 1-(4-methoxyphenyl)piperazine and 5 g. p-toluenesulfonic acid monohydrate in 100 ml. toluene were refluxed 46 hours separating off the water with a Dean-Stark trap. The cooled solution was treated with a saturated $NaHCO_3$ solution, washed with water, dried over anhydrous $Na_2SO_4$ and distilled under vacuum. The residual 26.8 g. were dissolved in hot chloroform-ethylacetate, filtered through neutral $Al_2O_3$ and cooled. 14 g. of 1-(3,4-dihydro-7-methoxy-1-naphthyl)-4-(4-methoxyphenyl)piperazine were obtained with a melting point of 143–144° C.

EXAMPLE 50

1-(3,4-Dihydro-7-methoxy-1-naphthyl)-4-phenyl-piperazine

In a reaction vessel 25 g. 7-methoxy-3,4-dihydro-1-(2H)-naphthalenone, 27.5 g. 1-phenylpiperazine and 6 g.

p-toluenesulfonic acid monohydrate in 150 ml. toluene were refluxed 34 hours separating off the water with a Dean-Stark trap. The cooled solution was treated with a saturated NaHCO$_3$ solution, washed with water, dried over anhydrous Na$_2$SO$_4$ and distilled under vacuum. The residue was crystallized from chloroform-ethanol. The 10.4 g. of 1-(3,4-dihydro-7-methoxy-1-naphthyl)-4-phenylpiperazine obtained had a melting point of 113–116° C.

EXAMPLE 51

1-(3,4-Dihydro-7-methoxy-1-naphthyl)-4-(2-methoxyphenyl)piperazine

In a reaction vessel 13 g. 7-methoxy-3,4-dihydro-1-(2H)-naphthalenone, 15 g. 1-(2-methoxyphenyl)piperazine and 6 g. p-toluenesulfonic acid monohydrate in 100 ml. toluene were refluxed 46 hours, separating off the water with a Dean-Stark trap. The cooled solution was treated with a saturated NaHCO$_3$ solution, washed with water, dried over anhydrous Na$_2$SO$_4$ and distilled under vacuum. The residue was dissolved in benzene-petroleum ether (1:1) and filtered through neutral Al$_2$O$_3$ and then crystallized from chloroform-hexane. The 5.7 g. of 1-(3,4-dihydro-7-methoxy-1-naphthyl)-4-(2-methoxyphenyl)piperazine obtained had a melting point of 106–108° C.

EXAMPLE 52A 3,4-Dihydro-1-(2H)-naphthalenone-7-methylsulfone Intermediate

To a stirred solution of 10 g. 3,4-dihydro-7-methylthio-1-(2H)-naphthalenone in 100 ml. acetic acid, 10 ml. of 35% H$_2$O$_2$ were dropped at 40° C. The solution was heated at 70° C. in 2 hours 45 minutes. The mixture was cooled, poured over an ice cooled Na$_2$S$_2$O$_3$ aqueous saturated solution. The obtained precipitate was collected, washed with water and crystallized from ethanol. The 2.3 g. of 3,4-dihydro-1-(2H)-naphthalenone-7-methylsulfone obtained had a melting point of 131–133° C.

EXAMPLE 52B 1-(3,4-Dihydro-7-methylsulfonyl-1-naphthyl)-4-(2-methoxyphenyl)piperazine In a reaction vessel 20 g. 3,4-dihydro-1(2H)-naphthalenone-7-methylsulfone, 25 g. 1-(2-methoxyphenyl)piperazine and 6 g. anhydrous p-toluenesulfonic acid in 150 ml. anhydrous toluene were refluxed 30 hours separating off the water with a Dean-Stark trap. The cooled solution was treated with a saturated NaHCO$_3$ solution, washed with water, dried over anhydrous Na$_2$SO$_4$ and distilled under vacuum. The residual 30 g. were crystallized from chloroform. The 1-(3,4-dihydro-7-methylsulfonyl-1-naphthyl)-4-(2-methoxyphenyl)piperazine obtained had a melting point of 188.5–190.5° C.

EXAMPLE 53

1-(6,7-Dihydro-5H-benzocyclohepten-9-yl)-4-(4-chlorophenyl)piperazine

In a reaction vessel 10 g. 6,7,8,9-tetrahydro-5H-benzocyclohepten-9-one, 13.5 g. 1-(4-chlorophenyl)piperazine and 5 g. p-toluenesulfonic acid monohydrate in 120 ml. toluene were refluxed 21 hours separating off the water with a Dean-Stark trap. The cooled solution was treated with a saturated NaHCO$_3$ solution, washed with water, dried over anhydrous Na$_2$SO$_4$ and then distilled under vacuum. The residual 19.5 g. of 1-(6,7-dihydro-5H-benzocyclohepten-9-yl)-4-(4-chlorophenyl)piperazine were crystallized from chloroform ethanol and had a melting point of 140–141° C.

EXAMPLE 54

1-(2-Methyl-6,7-dihydro-5H-benzocyclohepten-9-yl)-4-phenyl-piperazine

In a reaction vessel 14 g. 2 - methyl - 6,7,8,9 - tetrahydro - 5H - benzocyclohepten-5-one, 15 g. 1-phenylpiperazine and 5 g. p-toluenesulfonic acid monohydrate in 150 ml. toluene were refluxed 22 hours separating off the water with a Dean-Stark trap. The cooled solution was treated with a saturated NaHCO$_3$ solution, washed with water, dried over anhydrous Na$_2$SO$_4$ and distilled under vacuum. The residual 20 g. were dissolved in hot chloroform-ethylacetate (1:1) and filtered through neutral Al$_2$O$_3$. The solution was cooled. The obtained 8.1 g. of 1 - (2 - methyl - 6,7 - dihydro-5H-benzocyclohepten-9-yl)-4-phenylpiperazine had a melting point of 153.5–155° C.

EXAMPLE 55

1-(2-Methyl-6,7-dihydro-5H-benzocyclohepten-9-yl)-4-methyl-piperazine

In a reaction vessel 13.5 g. 2 - methyl - 6,7,8,9 - tetrahydro - 5H - benzocyclohepten - 9 - one, 11.3 g. 1 - methylpiperazine and 5 g. p - toluenesulfonic acid monohydrate in 150 ml. toluene were refluxed 22 hours separating off the water with a Dean-Stark trap. The cooled mixture was treated with a saturated solution of NaHCO$_3$, washed with water, dried over anhydrous Na$_2$SO$_4$ and distilled under vacuum. The 16.3 g. of 1 - (2 - methyl - 6,7 - dihydro-5H-benzocyclohepten - 9 - yl) - 4 - methylpiperazine were distilled, boiling point 144° C./0.02 mm. Hg, 9.3 g.

EXAMPLE 56

1-(6,7-Dihydro-5H-benzocyclohepten-9-yl)-4-ethoxycarbonylpiperazine

In a reaction vessel 17.4 g. 6,7,8,9 - tetrahydro - 5H-benzocyclohepten - 9 - one, 31.1 g. 1 - ethoxycarbonylpiperazine and 6 g. p-toluenesulfonic acid monohydrate in 120 ml. toluene were refluxed 21 hours separating off the water with a Dean-Stark trap. The cooled solution was treated with a saturated solution of NaHCO$_3$, washed with water, dried over anhydrous Na$_2$SO$_4$ and distilled under vacuum. The residual 32.8 g. were distilled, boiling point 177–180° C./0.005 mm. Hg, 26.4 g. of 1-(6,7-dihydro - 5H -benzocyclohepten - 9 - yl) - 4 - ethoxycarbonylpiperazine was crystallized from ethylacetate at —40° C. yielding 13.1 g. of white crystals with a melting point of 57–59° C.

EXAMPLE 57

1-(6,7-Dihydro-5H-benzocyclohepten-9-yl)-4-methylpiperazine

In a reaction vessel 17.5 g. 6,7,8,9 - tetrahydro - 5H-benzocyclohepten-9-one, 17 g. 1 - methylpiperazine and 2.5 g. p-toluenesulfonic acid monohydrate in 150 ml. toluene were refluxed 22 hours separating off the water with a Dean-Stark trap. The cooled solution was treated with a saturated NaHCO$_3$ solution, washed with water, dried over anhydrous Na$_2$SO$_4$ and distilled under vacuum. The residual 23.5 g. were distilled, boiling point 118–120/0.005 mm. Hg, 7.6 g. The compound 1 - (6,7 - dihydro - 5H-benzocyclohepten-9-yl) - 4 - methylpiperazine was crystallized from petroleum ether (40 to 70° C.) at —40° C. and had a melting point of 57–58° C.

EXAMPLE 58

1-(2-Nitro-6,7-dihydro-5H-benzocyclohepten-9-yl)-4-n-propylpiperazine

In a reaction vessel 10 g. 2 - nitro - 6,7,8,9 - tetrahydro-5H - benzocyclohepten - 9 - one, 10 g. 1 - n - propylpiperazine and 5 g. p-toluenesulfonic acid monohydrate in 100 ml. toluene were refluxed 48 hours separating off the water with a Dean-Stark trap. The cooled solution was treated with a saturated NaHCO$_3$ solution, washed with water, dried over anhydrous Na$_2$SO$_4$ and distilled under vacuum. The residual 14 g. were dissolved in hot petroleum ether (40 to 70° C.), filtered through neutral Al₂O₃ and cooled. The 8.5 g. of 1 - (2 - nitro-6,7-dihydro-5H-benzocyclohepten - 9 - yl) - 4 - n - propylpiperazine obtained had a melting point of 88–89° C.

EXAMPLE 59

1-(5,6-Dihydro-7,7-dimethyl-7H-benzocyclohepten-9-yl)-4-(3-trifluoromethylphenyl)piperazine In a reaction vessel 11 g. 5,6,8,9 - tetrahydro - 7,7-dimethyl - 7H - benzocyclohepten - 9 - one, 16.9 g. 1-(3-trifluoromethylphenyl)piperazine and 7 g. p-toluenesulfonic acid monohydrate in 100 ml. toluene were refluxed 48 hours separating off the water with a Dean-Stark trap. The cooled mixture was treated with a saturated NaHCO₃ solution, washed with water, dried over anhydrous Na₂SO₄ and distilled under vacuum. The residue was distilled, boiling point 190–193° C./0.01 mm. Hg, 8.1 g. The 1-(5,6-dihydro - 7,7 - dimethyl - 7H - benzocyclohepten-9-yl) - 4 - (3 - trifluoromethylphenyl)piperazine crystallized from petroleum ether (40 to 70° C.) with a melting point of 101–103° C.

EXAMPLE 60

1-(2-Chloro-6,7-dihydro-5H-benzocyclohepten-9-yl)-4-(N,N-dimethylacetamide)piperazine In a reaction vessel 16.1 g. 2-chloro-6,7,8,9-tetrahydro-5H-benzocyclohepten - 9 - one, 16.1 g. 1-(N,N-dimethylacetamide)piperazine and 6 g. p-toluenesulfonic acid monohydrate in 100 ml. toluene were refluxed 46 hours separating off the water with a Dean-Stark trap. The cooled mixture was treated with a saturated NaHCO₃ solution, washed with water, dried over anhydrous Na₂SO₄ and distilled under vacuum. The 1 - (2 - chloro-6,7-dihydro - 5H - benzocyclohepten - 9 - yl) - 4 - (N,N-dimethylacetamide)piperazine was crystallized from ethylacetate, filtering the hot solution through neutral Al₂O₃ and had a melting point of 125–127° C., 5.7 g.

EXAMPLE 61

1-(5,6-Dihydro-7,7-dimethyl-7H-benzocyclohepten-9-yl)-4-methylpiperazine

In a reaction vessel 15 g. 5,6,8,9 - tetrahydro - 7,7-dimethyl - 7H - benzocyclohepten - 9 - one, 15 g. 1-methylpiperazine and 7 g. p-toluenesulfonic acid monohydrate in 100 ml. toluene were refluxed 84 hours separating off the water with a Dean-Stark trap. The cooled solution was treated with a saturated NaHCO₃ solution, washed with water, dried over anhydrous Na₂SO₄ and distilled under vacuum. The residual 19 g. were distilled, boiling point 134–138° C./0.015 mm. Hg, 8.4 g. The compound was dissolved in petroleum ether (40 to 70° C.), filtered through neutral Al₂O₃ and cooled at −40° C. The obtained 1 - (5,6 - dihydro - 7,7 - dimethyl - 7H - benzocyclohepten-9-yl)-4-methylpiperazine had a melting point 51–52° C.

EXAMPLE 62

1-(2-Chloro-6,7-dihydro-5H-benzocyclohepten-9-yl)-4-methylpiperazine

In a reaction vessel 15.5 g. 2 - chloro - 6,7,8,9 - tetrahydro - 5H - benzocyclohepten - 9 - one, 11 g. 1-methylpiperazine and 6 g. p-toluenesulfonic acid monohydrate in 100 ml. toluene were refluxed 46 hours separating off the water with a Dean-Stark trap. The cooled solution was treated with a saturated NaHCO₃ solution, washed with water, dried over anhydrous Na₂SO₄ and distilled under vacuum. The residue was distilled, boiling point 134° C./0.005 mm. Hg, 6.1 g. The 1-(2-chloro-6,7-dihydro-5H-benzocyclohepten-9-yl) - 4 - methylpiperazine crystallized from petroleum ether (40 to 70° C.) and had a melting point of 83–85° C.

TABLE I

| Example: | $\lambda_{max}$; m$\mu$ [1] | $\epsilon$ |
|---|---|---|
| 1 | 232; 275 | 12,700; 4,850 |
| 2 | 233; 280 | 13,150; 4,400 |
| 3 | 233; 280 | 12,600; 4,420 |
| 4 | 248; 277 | 21,350; 6,400 |
| 5 | 234; 279 | 12,050; 4,250 |
| 6 | 248; 280 | 21,200; 6,150 |
| 7 | 242; 289 | 22,000; 5,850 |
| 8 | 225; 298 | 11,700; 19,300 |
| 9 | 297 | 20,700 |
| 10 | 226; 298 | 12,100; 20,400 |
| 11 | 225; 302 | 16,000; 16,700 |
| 12 | 225; 290 | 16,300; 16,500 |
| 13 | 229; 248; 295 | 15,200; 13,300; 22,900 |
| 14 | 230; 317 | 19,300; 45,700 |
| 15 | 293 | 20,300 |
| 16 | 256; 285; 295 | 23,600; 5,550; 5,560 |
| 17 | 264; 272 | 408; 366 |
| 18 | 240; 257 293; 313 | 17,400; 17,100 17,900; 16,200 |
| 19 | 251; 285 | 15,300; 1,670 |
| 20 | 232; 278 | 9,700; 3,470 |
| 21 | 225; 295 | 11,800; 18,600 |
| 22 | 276 | 4,900 |
| 23 | 226; 296 | 13,100; 20,400 |
| 24 | 233; 267 | 13,800; 5,620 |
| 25 | 223; 305 | 10,800; 23,000 |
| 26 | 229; 247; 302 | 15,000; 13,100; 26,500 |
| 27 | 233; 269; 286 | 14,100; 3,420; 4,050 |
| 28 | 296; 304 | 3,920; 3,610 |
| 30 | 233; 270 | 12,900; 4,620 |
| 31 | 238; 281 | 16,900; 7,570 |
| 32 | 248; 291 [2] | 13,600; 1,850 |
| 33 | 248; 288 [2] | 26,900; 3,240 |
| 34 | 234; 272 [2] | 14,400; 14,050 |
| 35 | 242; 234 | 25,100; 25,000 |
| 36 | 331; 256 | 20,753; 14,050 |
| 37 | 310 | 13,370 |
| 38 | 243; 293 | 10,800; 3,850 |
| 40 | 231; 256 | 21,800; 14,150 |
| 41 | 244 | 29,300 |
| 42 | 255 | 31,200 |
| 43 | 238 | 33,500 |
| 44 | 233 | 23,400 |
| 45 | 241 | 30,200 |
| 46 | 237 | 15,800 |
| 47 | 248; 282 | 17,950; 6,740 |
| 48 | 247; 300 | 14,700; 4,650 |
| 49 | 239; 303 | 21,200; 6,150 |
| 50 | 249; 302 | 21,300; 5,030 |
| 51 | 238; 245; 280 | 16,850; 16,300; 7,720 |
| 52B | 285; 247 | 6,880; 20,400 |
| 53 | 257 | 21,850 |
| 54 | 244 | 18,100 |
| 55 | 274 [2] | 4,150 |
| 56 | 269; 224 [2] | 3,900; 13,750 |
| 57 | 224; 271 [2] | 13,150; 3,650 |
| 58 | 220 [2] | 22,580 |
| 59 | 254 [2] | 19,100 |
| 60 | 280 [2] | 3,400 |
| 61 | 273; 229 [2] | 4,700; 11,300 |
| 62 | 280 [2] | 3,450 |

[1] Solvent, cyclohexane except where noted.
[2] Solvent, ethanol 95%.

The pharmacological activity of the several different compounds described above will be shown in the following tables.

TABLE II

Analgesic activity (hot plate); anti-inflammatory activity (carrageenin test); body temperature

| Compound of Example: | Dose, mg./kg./os | Analgesic time increase | Anti-inflammatory, percent inhibition oedema | Lowering ° C. after hours 3–5 |
|---|---|---|---|---|
| 4 | 400 | 208 | 33 | −2.8 |
| 5 | 185 | 224 | 35 | |
| 8 | 160 | 140 | 55 | −1.6 |
| 9 | 215 | 215 | 53 | |
| 10 | 120 | 183 | | −1.6 |
| 11 | 325 | 116 | 35 | −1.2 |
| 12 | 400 | 158 | 64 | −2.3 |
| 13 | 185 | 294 | 45 | −2.6 |
| 14 | 400 | 247 | 47 | −1.6 |
| 15 | 280 | 252 | 27 | |
| 16 | 400 | 153 | 34 | |
| 18 | 400 | | 50. 23 | |
| 31 | 372 | 505 | 57 | −2.3 |
| 34 | 107 | 175 | | −2.3 |
| 35 | 186 | 172 | 39 | −4.8 |
| 36 | 400 | 245 | 73.5 | −4.8 |
| 38 | 71 | 300 | | −1.4 |
| 46 | 325 | | | 2.7 |
| 48 | 400 | | | 2.2 |
| 51 | 215 | | | 2. |

TABLE III
Spontaneous motility (Dew's method) and myorelaxant activity in mouse (Kinnard's method)

| Compound of Example: | Dose, mg./kg./os | Spontaneous motility, percent reduction | Muscle relax, animals, percent |
|---|---|---|---|
| 1 | 140 | 39.73 | NN |
| 4 | 400 | 81.75 | NN |
| 5 | 185 | 34.28 | NN |
| 8 | 160 | 86.47 | 50 |
| 9 | 215 | 60.00 | 10 |
| 10 | 120 | 64.94 | 20 |
| 11 | 325 | 58.86 | NN |
| 12 | 400 | 80.48 | 10 |
| 13 | 185 | 79.37 | 50 |
| 14 | 400 | 81.64 | 80 |
| 15 | 280 | 33.10 | NN |
| 17 | 106 | 34.94 | NN |
| 30 | 400 | 56.20 | ---- |
| 31 | 372 | 69.31 | 80 |
| 34 | 107 | 85.75 | 50 |
| 38 | 71 | 59.50 | ---- |
| 41 | 283 | 74.29 | ---- |
| 49 | 400 | 67.43 | ---- |
| 50 | 400 | 84.8 | ---- |
| 51 | 216 | 78.5 | ---- |

TABLE V
Choleretic and diuretic activity on rats at a dose of 50 mg./kg./os

| Compound of Example: | Percent increase of— Bile flow | Percent increase of— Diuresis |
|---|---|---|
| 2 | NN | 59.77 |
| 3 | 31.76 | 51.40 |
| 5 | 17.05 | 71.05 |
| 8 | NN | 35.53 |
| 9 | NN | 38.15 |
| 10 | 12.99 | 23.12 |
| 12 | 19.06 | 45.67 |
| 15 | 15.83 | NN |
|  |  | 46.61 |
| 34 | ---- | 107 |

What is claimed is:

1. A dihydronaphthalene compound having the formula

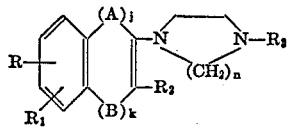

wherein R and R₁ are each individually selected from the group consisting of hydrogen, halogen, (lower)alkyl, (lower)alkoxy, nitro, (lower)alkyl thio or (lower)alkyl sulfonyl with the proviso that one of R and R₁ is hydrogen; R₂ is selected from the group consisting of hydrogen, phenyl or carboxy; R₃ is selected from the group consisting of hydrogen, (lower)alkyl, phenyl, phenyl substituted with a halogen, trifluoromethyl, (lower)alkoxy or (lower)alkyl, picolyl, benzyl, benzyl substituted with a halogen, (lower)alkoxy or (lower)alkyl, (lower)alkoxy carbonyl, N-monoalkyl acetamide, N,N-dialkyl acetamide, N-phenyl acetamide, N-monoalkyl propionamide or N,N-dialkylpropionamide, n is a whole integer of 2 or 3, A and B are each independently selected from the radicals —CH₂—CH₂— or —CH(CH₃)—CH₂—;

j is 1 and k is 0; and the (lower)alkyl and alkyl portions of the groups have 1 to 6 carbon atoms; or a pharmaceutically acceptable acid addition salt thereof.

2. A dihydronaphthalene compound having the formula

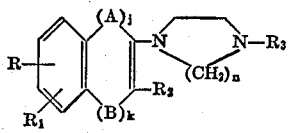

wherein R and R₁ are each individually selected from the group consisting of hydrogen, halogen, (lower)alkyl, (lower)alkoxy, nitro, (lower)alkyl thio or (lower)alkyl sulfonyl with the proviso that one of R and R₁ is hydrogen; R₂ is selected from the group consisting of hydrogen, phenyl or carboxy; R₃ is selected from the group consisting of hydrogen, (lower)alkyl, phenyl, phenyl substituted with a halogen, trifluoromethyl, (lower)alkoxy or (lower)alkyl, picolyl, benzyl, benzyl substituted with a halogen, (lower)alkoxy or (lower)alkyl, (lower)alkoxy carbonyl, N-monoalkyl acetamide, N,N-dialkyl acetamide, N-phenyl acetamide, N-monoalkyl propionamide or N,N-dialkylpropionamide, n is a whole integer of 2 or 3, A and B are each independently selected from the radicals —CH₂—CH₂— or —CH(CH₃)—CH₂—;

j is 0 and k is 1; and the (lower)alkyl and alkyl portions of the groups have 1 to 6 carbon atoms; or a pharmaceutically acceptable acid addition salt thereof.

3. A dihydronaphthalene compound having the formula

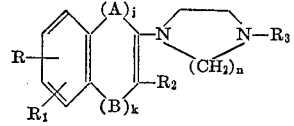

wherein R and R₁ are each individually selected from the group consisting of hydrogen, halogen, (lower)alkyl, (lower)alkoxy, nitro, (lower)alkyl thio or (lower)alkyl sulfonyl with the proviso that one of R and R₁ is hydrogen; R₂ is selected from the group consisting of hydrogen, phenyl or carboxy; R₃ is selected from the group consisting of hydrogen, (lower)alkyl, phenyl, phenyl substituted with a halogen, trifluoromethyl, (lower)alkoxy or (lower)alkyl, picolyl, benzyl, benzyl substituted with a halogen, (lower)alkoxy or (lower)alkyl, (lower)alkoxy carbonyl, N-monoalkyl acetamide, N,N-dialkyl acetamide, N-phenyl acetamide, N-monoalkylpropionamide or N,N-dialkylpropionamide, n is a whole integer of 2 or 3, A and B are each independently selected from the radicals —CH₂— and —C(CH₃)₂—; j is 1 and k is 1; and the (lower)alkyl and alkyl portions of the groups have 1 to 6 carbon atoms; or a pharmaceutically acceptable acid addition salt thereof.

4. The compound of claim 1 wherein R and R₁ are each individually selected from hydrogen, halogen or (lower)alkoxy; and R₃ is selected from (lower)alkyl, picolyl, (lower)alkoxy carbonyl, dialkyl acetamide, phenyl or benzyl wherein the phenyl or benzyl radical may be substituted with a substituent selected from halogen, (lower) alkyl or (lower)alkoxy.

5. The compound of claim 2 wherein R and R₁ are each individually selected from hydrogen, halogen or (lower) alkoxy; and R₃ is selected from (lower)alkyl, picolyl, (lower)alkoxy carbonyl, dialkyl acetamide, phenyl or benzyl wherein the phenyl or benzyl radical may be substituted with a substituent selected from halogen, (lower) alkyl or (lower)alkoxy.

6. The compound of claim 12 wherein R and R₁ are each individually selected from hydrogen, halogen or (lower)alkoxy; and R₃ is selected from (lower)alkyl, picolyl, (lower)alkoxy carbonyl, dialkyl acetamide, phenyl or benzyl wherein the phenyl or benzyl radical may be substituted with a substituent selected from halogen, (lower)alkyl or (lower)alkoxy.

7. The compound of claim 4 wherein n is 2, R is hydrogen and R₂ is hydrogen.

8. The compound of claim 5 wherein n is 2, R is hydrogen and R₂ is hydrogen.

9. The compound of claim 7 wherein R₁ is hydrogen and A is the radical —CH₂—CH₂—.

10. The compound of claim 8 wherein R₁ is hydrogen and B is the radical —CH₂—CH₂—.

11. The compound of claim 9 wherein R₃ is (lower) alkyl.

12. The compound of claim 9 wherein R₃ is phenyl or p-chlorophenyl.

13. The compound of claim 10 wherein $R_3$ is (lower) alkyl.

14. The compound of claim 10 wherein $R_3$ is phenyl, p-chlorophenyl or p-methoxyphenyl.

15. The compound of claim 2 which is N - (3,4 - dihydro-1-naphthyl)-N'-phenylpiperazine.

16. The compound of claim 1 which is N-(3,4-dihydro-2-naphthyl)-N'-methylpiperazine.

References Cited
UNITED STATES PATENTS

| | | | |
|---|---|---|---|
| 3,704,323 | 11/1972 | Krapcho | 260—268 BC |
| 3,361,788 | 1/1968 | Weil | 260—268 PC |
| 3,573,980 | 4/1971 | Mastursi et al. | 260—268 PR |

FOREIGN PATENTS

| | | | |
|---|---|---|---|
| 1,545,673 | 8/1969 | Germany | 260—268 BC |
| 1,190,466 | 4/1965 | Germany | 260—26 PH |

OTHER REFERENCES

Popov: Chem. Abstr., vol. 67, col. 54102 (1967).
Sam et al.: Chem. Abstr., vol. 63, col. 6937–8 (1965).

DONALD G. DAUS, Primary Examiner

U.S. Cl. X.R.

260—239 BC, 268 PH, 268 C, 607 A; 424—244, 250